Nov. 24, 1970
R. G. BUSH ET AL  3,542,570
PROCESS OF MANUFACTURING INDIVIDUALLY WRAPPED SLICES
OF EXTRUDABLE PRODUCTS
Filed Feb. 10, 1967
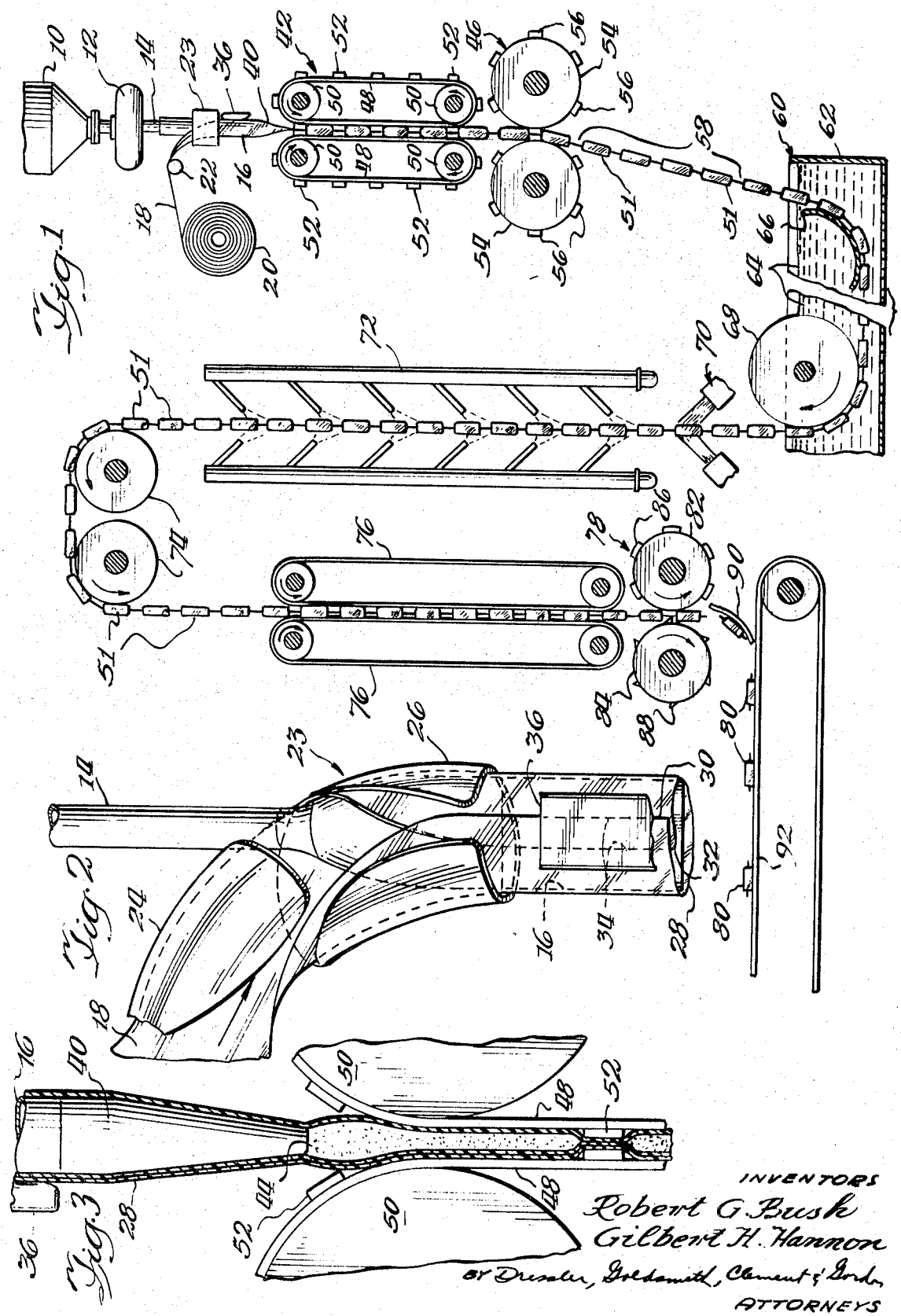
INVENTORS
Robert G. Bush
Gilbert H. Hannon
BY Dressler, Goldsmith, Clement & Gordon
ATTORNEYS

# United States Patent Office 3,542,570
Patented Nov. 24, 1970

3,542,570
PROCESS OF MANUFACTURING INDIVIDU-
ALLY WRAPPED SLICES OF EXTRUDABLE
PRODUCTS
Robert G. Bush and Gilbert H. Hannon, Green Bay, Wis.,
assignors to L. D. Schreiber Cheese Company, Inc., a
corporation of Wisconsin
Filed Feb. 10, 1967, Ser. No. 615,121
Int. Cl. A23c *19/16*
U.S. Cl. 99—178
7 Claims

ABSTRACT OF THE DISCLOSURE

A method for making individually wrapped slices of extrudable products including the steps of forming a wrapper into a tube, forcing product into the tube, transversely sealing the tube at spaced intervals to form individually wrapped packets, appropriately treating the packets and severing the packets to form individually wrapped slices sealed at opposite ends and containing product in intimate contact with the wrapper.

BACKGROUND

One problem in the marketing of processed pre-sliced products arises, not in the preparation, sale or display of the product, but only after the package has been purchased by the consumer. For example, almost everyone is familiar with the inconvenience of separating individual slices of cheese from each other once a package of sliced cheese is opened. This problem can be counteracted to some extent by interleaving thin sheets of tissue between the slices so that each slice may be more readily separated from the next adjacent slice in the package.

This expedient does not prevent the cheese from becoming hard, however, if it is not consumed within a reasonably short time after the package is opened. It is desirable, therefore, to provide some method which not only allows for relatively easy separation of the slices one from the other but also protects the cheese product against rapid dehydration once the outer package or overwrap is opened.

The problem can be overcome by individually wrapping each slice of cheese product. The problem of producing such individually wrapped slices on a commercial basis is considerably more difficult than might be immediately apparent. An obstacle to developing a process for manufacturing such slices is that such a process must be commercially competitive. Any additional cost in individually wrapping each slice must, in highly competitive markets, be held to a minimum.

If an individually wrapped slice, cheese, for example, is to remain fresh after its outer package is opened, no air should be allowed to find its way to the slice, i.e., the wrapper should be in intimate contact with the cheese product. At the same time the wrapper for each individual slice should be easily removable, and the slice should take up substantially the same amount of space in a package as is taken up by unwrapped or bulk products.

For marketing purposes such individually wrapped cheese slices may be wrapped in the ordinary multi-slice packages similar to those presently being used for unwrapped slices. When such a package of individually wrapped cheese slices is opened, each slice remains in a usable state, since it is protected by its own individual wrapper.

SUMMARY OF INVENTION

In accordance with the present invention, there is provided a method of manufacturing individually wrapped slices in which a continuous web of film to be used as the wrapping material is fed externally of a forming member and nozzle through which a hot viscous product, cheese being a typical example, is being pumped. The film is stretched taut around the forming member and is shaped into a tube having a longitudinal seam formed by the edges of the web overlapping one on the other. If desirable, the tube may be closed by forming a continuous peelable seal along the overlap portion of the tube.

The tube is drawn across the nozzle by an advancing mechanism and is flattened until it assumes approximately the same thickness as the desired individual slices. As the tube passes over the end of the nozzle and into the advancing mechanism, hot viscous product is forced from the end of the nozzle to form a "pool" of product in the tube adjacent the entrance of the advancing mechanism. This pool of product insures that the tube entering the packeting mechanism is completely filled so that no air is present between the product and the wrapper.

The advancing mechanism operates to draw the wrapper over the forming member and nozzle to feed it into the crimper. The crimper transversely seals the product-filled tube at longitudinally spaced intervals to form the tube into a chain of discrete product-containing packets. Since the individual packets are filled while the product is in its hot viscous state, the product is squeezed into the packets adjoining the sealed areas, thereby insuring that each packet is completely filled all the way to its edges.

If desired, the advancing mechanism may also be designed to pinch the tube together at the longitudinally spaced intervals to pre-form the packets prior to sealing. If the tube is pre-formed in the advancing mechanism, the crimper seals the ends of each packet along the pinched portion of the tube.

The chain of discrete packets may then be treated, e.g., if the product is cheese, the chain could be cooled to solidify the cheese product after which each packet is severed from the chain down the middle of the transverse seal, thereby forming the individually wrapped slices sealed at opposite ends. The individually wrapped slices may then be stacked as desired and overwrapped to form a package of individually wrapped cheese slices.

Thus, there has been described a process for manufacturing individually wrapped slices of an extrudable product in which the individually wrapped slices are processed continuously, automatically and rapidly. The wrapping of the slice while it is still in a viscous state prevents trapping of air between the cheese and the wrapping material by insuring intimate contact between the cheese and the wrapper. Easy removal of the wrapper is facilitated by the overlapping edges of the wrapper forming the longitudinal center seam of the package thereby creating a "handle" for the consumer.

While the above descripiton and the following specification for convenience sets forth the novel process in terms of producing individually wrapped slices of cheese product, it should be understood that individually wrapped slices of other extrudable products may be continuously formed by use of the novel process. It might be desirable after forming and sealing each packet to treat the chain of packets in some other way in addition to, or instead of, cooling. As one example, it might be appropriate to smoke the chain of packets or to "cook" the product contained within the packets in some other way depending upon the product being individually wrapped.

Numerous other advantages and features of the present invention will become readily apparent from the following detailed description of the invention and one embodiment thereof, from the claims and from the accompanying drawings in which each and every detail shown is fully and completely disclosed as a part of this specification, and in which like reference numerals refer to like parts and in which:

FIG. 1 is a diagrammatic representaiton of one embodiment of an apparatus suitable for use in carrying out the method of the present invention;

FIG. 2 is an enlarged diagrammatic view of a portion of the apparatus showing how the wrapper may be formed into a tube; and FIG. 3 is an enlarged view showing how the tubular wrapper is flattened as it passes over the nozzle and showing the cheese product being forced into the flattened tube.

The cheese product to be wrapped is supplied in a hot viscous state to a hopper 10 from a source (not shown). The cheese product is transmitted by a suitable pump 12 through sanitary piping 14 into the rear end of a hollow forming member 16.

A continuous web 18 of wrapping material is supplied from a roll 20 located adjacent to the forming member 16 and is led over a guide roller 22 to a point external to the rear end of the forming member 16. A film suitable for use as a wrapper for cheese slices should be moisture proof and gas proof and may have a thickness of approximately .00075 inch, for example, a Saran coated cellophane such as is made by Avisco under the designation of RS-2 film.

As the web is drawn over the forming member 16, which conveniently takes the shape of a cylinder, it passes through a suitable shaper 23, including elements 24, 26 which cause the web to be drawn tightly around the forming member 16 into the shape of a tube 28 having its edges 30, 32 overlapping to form a longitudinal seam 34. The tube 28 passes between the forming member 16 and a heat-sealing unit 36 which closes the tube by forming a continuous peelable seal along the overlapping seam 34 of the tube. The outside edge 30 of the tube is used as a handle to peel back the wrapper from the individual slice of cheese when it is desired to open the individually wrapped slice.

The closed tube 28 is advanced along forming member 16 and passes over nozzle 40, attached thereto. The nozzle 40 is tapered so that the tube 28 is flattened as it passes over the nozzle and assumes an elongated shape before entering the advancing mechanism 42.

As the tube 28 leaves the nozzle 40 and enters into the advancing mechanism 42 disposed directly therebelow, hot viscous cheese product is extruded from the mouth of the nozzle 40 into the tube. The cheese product forms a "pool" 44 within the tube immediately adjacent to the entrance of advancing mechanism 42 which is continuously squeezed back as the tube 28 enters mechanism 42, thereby forcing the wrapping material into intimate contact with the product. This intimate contact eliminates air between the cheese and the wrapper to insure that the tube is completely filled.

The advancing mechanism 42 is the prime mover in causing the wrapper to advance over the forming member 16, nozzle 40 and into a crimper mechanism 46. One suitable advancing mechanism is shown in the drawings and may conveniently comprise a pair of continuously driven endless belts 48 powered by drive wheels 50 which may be positively coupled to each other in order to maintain the belts 48 in synchronism with each other. As seen most clearly in FIG. 3, the belts 48 apply pressure to the product-filled tube to insure that it is completely filled with product and that the product is in intimate contact with the inner surfaces of the wrapping material.

If desirable, the advancing mechanism may also "preform" the tube into discrete packets 51 by pinching the tube together at longitudinally spaced intervals. This may be accomplished by adding a plurality of cleats 52 on each belt 48 arranged so that a pair of cleats, one on each belt, come into engagement with each other to pinch the tube 28 together (see FIG. 3).

The advancing mechanism 42 discharges the tube 28 into the crimper mechanism 46 which transversely seals the tube together at longitudinally spaced intervals. If the tube 28 has been pre-formed in the advancing mechanism 42, the crimper mechanism 46 seals the tube together along the protions of the tube pinched together in the advancing mechanism. Sealing of the tube is preferably accomplished while the product in the tube is still in its viscous state so pressure applied to the sides of each packet between seals distributes the product uniformly throughout the packet. This results in an individually wrapped slice of substantially uniform thickness and having generally flat parallel faces. The seal may be effected in any of several known manners, such as, for example, by leaving a thin film of the product in the area of the seal, or by using a heat-sealable wrapper and by heating the crimping mechanism where it presses the wrapper together.

One suitable type of crimper, as illustrated in FIG. 1, includes a pair of synchronized rotating drums 54. The drums 54 each includes a plurality of crimping members 56 spaced around the periphery thereof. The faces of crimping members 56 may be corrugated to provide a corrugated seal when they mate. Such a corrugated seal enhances the characteristics of the seal. The drums 54 rotate at a rate which causes the crimping members 56 to come into contact each with the other along the transverse pinched areas, if the tube has been pre-formed in the advancing mechanism. The drums 54 may be so spaced from each other so their surfaces between crimping members 56 apply pressure to the face of each packet to eliminate any bulges in the packet, particularly adjacent the seal. The resulting individually wrapped slice is of substantially uniform thickness and has generally flat parallel faces.

Before stacking the individual slices and wrapping them with an overwrap in order to form a package, it is desirable to cool the cheese product until it assumes its desired consistency. The chain 58 of sealed packets 51 is led from the crimper 46 into a suitable cooling device 60. As illustrated in FIG. 1, one suitable form of such a cooling device consists of a tank 62 containing a water and ice bath 64 at a temperature of around 32° F. The chain 58 of packets 51 is led around a guide 66 into the bath 64 and makes one or more passes therethrough until it assumes its desired consistency. One pass of the chain 58 through the bath 64 is illustrated.

When the cheese product has been suitably cooled, the chain 58 is led from the bath 64 around a guide 68. Excess water on the surface of the chain 58 may be removed by passing the chain successively through a squeegee indicated diagrammatically at 70, followed by air blasts indicated diagrammatically at 72 and in turn followed by several passes around vacuum drying rolls 74. It should be understood that any suitable drying steps may be used to remove the water from the chain of packets 58.

When the chain 58 has been dried, it enters a set of vertical timing belts 76 synchronized with a cut-off apparatus 78 located at the discharge end of the timing belts 76. As the chain leaves the timing belts 76, it enters the cut-off apparatus 78 which severs individual slices 80 along the transverse seals.

One suitable cut-off apparatus 78 includes a pair of synchronized rotating drums 82, 84. One of the drums 82 includes a plurality of anvil-like members 86 spaced around the periphery thereof, while the other drum 84 is provided with a plurality of correspondingly spaced knife blades 88. The anvils 86 of knife blades 88 are spaced, and the drums 82, 84 are rotated so the blades 88 come into contact with the anvils 86 along the center of the transverse seals between each packet 51 to sever the chain into individual slices 80.

The individually wrapped slices 80 drop into a chute 90 and slide onto a conveyor belt 92 disposed therebelow. The conveyor belt 92 transports the individual slices 80 away from the chute 90 to a point where they may be stacked by any suitable stacking mechanism (not shown). The stacked slices may then be wrapped in a suitable overwrap machine (not shown) to form a package of individually wrapped slices.

Thus, there has been described a process for making individually wrapped slices of products such as cheese in which the product is continuously extruded into a moving closed continuous tubular wrapper, in which the tube is divided into a chain of discrete packets of cheese product sealed at each end as the wrapper is drawn away from the cheese supply, in which the cheese in each packet is cooled to its final consistency, and in which the individual packets are severed from the chain of packets to form individually wrapped slices of cheese product which are stacked and wrapped into multi-slice packages.

Again it should be emphasized that while, for convenience, the present invention has been described in regard to a process for producing individually wrapped slices of cheese product, it may be used to form individually wrapped slices of any suitable extrudable or flowable product capable of being deposited in a closed tube. Furthermore, although the process has been described to include a cooling step after the individual packets have been formed, it should be understood that any other treatment step may be substituted or added to any point in the process depending upon the product being formed into individually wrapped slices.

While each individually wrapped slice has been illustrated herein as being severed from the chain, it is clear that a series of such slices may remain connected together. Such would occur, for example, it it were desired to accordion-fold a plurality of slices together, or possibly wind a plurality of unseparated slices into a roll for use in some type of automatic dispenser. Thus, the cut-off mechanism, wherever it might be located in the system, would be adjusted to sever the chain after a preselected number of interconnected slices had passed therethrough.

It will be readily observed from the foregoing detailed description of the invention and the illustrated embodiment thereof that numerous variations and modifications may be effected without departing from the true spirit and scope of the novel concept of the principles of this invention.

What is claimed is:

1. A method of producing thin smooth individually wrapped slices of cheese product including the steps of continuously passing a web of thin film-like wrapping material externally of a forming member to shape the web into a tube having a longitudinal seam, forming a peelable seal along the seam, flattening and continuously advancing said tube longitudinally along the forming member and over a nozzle attached thereto while continuously forcing a fluent hot viscous cheese product from said nozzle into the flattened tube, transversely pressing the tube together at longitudinally spaced intervals to force the hot cheese product to flow from said intervals into adjacent areas while leaving a thin film of product at the intervals which seals said tube and divides said tube into a chain of closed discrete packets completely filled with hot cheese product, passing said chain of packets through a cooling bath subsequent to the completion of the sealing step until the cheese assumes a desired consistency, drying the outer surfaces of said cooled packets, and severing said discrete packets from the chain to form individually wrapped slices of cheese product, selectively stacking a number of slices one on the other, and overwrapping the stack to form a package of individually wrapped slices.

2. A method in accordance with claim 1 including the step of applying sufficient pressure to the surface of said packets to provide the individually wrapped slices of the cheese product with a substantially uniform thickness.

3. A method in accordance with claim 1 in which the ends of said packets are sealed while the cheese product is in its viscous state and including the step of applying sufficient pressure to the surface of said packets to provide the individually wrapped slices of cheese product with a substantially uniform thickness.

4. A method of producing interconnected individually wrapped slices of cheese product including the steps of continuously advancing a web of wrapping material and forming a tube therefrom, directing a fluent hot viscous cheese product into said tube in continuous and intimate contact with the inner surfaces thereof, transversely pressing said tube together at longitudinally spaced intervals to force the hot cheese product to flow from said intervals into adjacent areas while leaving a thin film of product at the intervals which seals said tube to form a chain of discrete packets each filled with said hot cheese product, and thereafter cooling the cheese product contained in said packets until the cheese assumes a desired consistency to form a plurality of interconnected individually wrapped slices of cheese product.

5. A method of producing individually wrapped slices of extrudable product which is solid at ambient temperature including the steps of continuously advancing a web of wrapping material, forming said web into a closed tube, continuously advancing said tube and continuously extruding said product heated to a viscous fluent state into said closed tube and into intimate contact with all of the inner surfaces thereof, introducing said tube with said hot product therein between a pair of continuously moving parallel belts to advance and flatten said product filled tube, subsequently transversely pressing together said tube at longitudinally spaced apart intervals to force the hot product to flow from said intervals into adjacent areas while leaving a thin film of product at the intervals which transversely seals said tube and forms a chain of discrete packets each completely filled with said hot extruded product, thereafter cooling said chain of discrete packets, and severing packets from said chain to form individually wrapped slices of said extrudable product.

6. The method of claim 5 including the step of extruding a sufficient amount of hot product into said tube to form a pool of said product at the point where said tube is introduced between said belts.

7. A method of producing individually wrapped slices of an extrudable product including the steps of continuously advancing a web of wrapping material, forming said web into a closed tube, flattening said tube until it assumes a substantially uniform thickness, continuously extruding a fluent hot viscous cheese product into said closed tube at a rate sufficient to form a pool of excess hot cheese product at the point where said tube is flattened to insure intimate contact between the hot cheese product with all of the inner surfaces of said tube, subsequently transversely pressing together said flattened tube at longitudinally spaced apart intervals to force the hot product to flow from said intervals into adjacent areas while leaving a thin film of product at the intervals which transversely seals said tube and forms a chain of discrete packets each completely filled with said hot extruded product, thereafter cooling said chain of discrete packets, and severing packets from said chain to form individually wrapped slices of said extrudable product.

References Cited

UNITED STATES PATENTS

| | | | |
|---|---|---|---|
| 2,759,308 | 8/1956 | Nawrocki | 53—122 XR |
| 3,344,521 | 10/1967 | Fievet | 31—46 |
| 2,686,128 | 8/1954 | Conti | 99—171 |
| 2,916,864 | 12/1959 | Meissner | 53—180 |

OTHER REFERENCES

"Strip Package for Cheese Slices," in Modern Packaging, February 1956, pp. 86–88.

A. LOUIS MONACELL, Primary Examiner

W. R. BOVEE, Assistant Examiner